(12) United States Patent
Lu et al.

(10) Patent No.: US 10,214,003 B2
(45) Date of Patent: Feb. 26, 2019

(54) 3D PRINTING METHOD IMPLEMENTED BY MOVABLE PLATFORM

(71) Applicants: XYZPRINTING, INC., New Taipei (TW); KINPO ELECTRONICS, INC., New Taipei (TW)

(72) Inventors: Ting-Yu Lu, New Taipei (TW); Ching-Hua Su, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 231 days.

(21) Appl. No.: 15/341,917

(22) Filed: Nov. 2, 2016

(65) Prior Publication Data

US 2018/0065321 A1 Mar. 8, 2018

(30) Foreign Application Priority Data

Sep. 2, 2016 (CN) .......................... 2016 1 0800648

(51) Int. Cl.
*B29C 67/00* (2017.01)
*B33Y 10/00* (2015.01)
(Continued)

(52) U.S. Cl.
CPC ............ *B33Y 10/00* (2014.12); *B29C 64/112* (2017.08); *B29C 64/20* (2017.08); *B33Y 30/00* (2014.12); *B33Y 50/02* (2014.12); *B29C 64/386* (2017.08)

(58) Field of Classification Search
None
See application file for complete search history.

(56) References Cited

U.S. PATENT DOCUMENTS

| 9,764,514 B2 * | 9/2017 | Albert ..................... B29C 47/92 |
| 2005/0225007 A1 * | 10/2005 | Lai ..................... G05B 19/4099 |
| | | 264/308 |
| 2015/0147424 A1 * | 5/2015 | Bibas ................... B29C 67/0088 |
| | | 425/150 |
| 2015/0251358 A1 | 9/2015 | Ho et al. |

(Continued)

FOREIGN PATENT DOCUMENTS

| CN | 1819922 A | 8/2006 |
| CN | 105584042 A | 5/2016 |

(Continued)

OTHER PUBLICATIONS

Search Report dated Jul. 18, 2017 of the corresponding European patent application No.17152695.7.
(Continued)

*Primary Examiner* — Ramesh B Patel
(74) *Attorney, Agent, or Firm* — Chun-Ming Shih; HDLS IPR Services

(57) ABSTRACT

A 3D printing method implemented by movable platform is disclosed. When printing a printing layer, a 3D printer first calculates respectively a starting point and an ending point of each swath of the printing layer, and calculates movement information of a movable printing platform upon an X-axis and a Y-axis of the 3D printer according to the starting points and the ending points. Next, the 3D printer controls the printing platform to move along the X-axis and the Y-axis based on the movement information, and controls a nozzle of the 3D printer to jet ink while the printing platform moves to corresponding positions. Therefore, the 3D printer uses the printing platform to complete printing actions of each swath.

8 Claims, 8 Drawing Sheets

(51) Int. Cl.
    *B33Y 30/00*     (2015.01)
    *B33Y 50/02*     (2015.01)
    *B29C 64/112*     (2017.01)
    *B29C 64/20*     (2017.01)
    *B29C 64/386*     (2017.01)

(56) References Cited

U.S. PATENT DOCUMENTS

| | | | |
|---|---|---|---|
| 2015/0321419 A1* | 11/2015 | Linthicum | B29C 47/0002 264/308 |
| 2016/0067740 A1* | 3/2016 | Voris | B29C 67/0055 427/402 |
| 2016/0214327 A1* | 7/2016 | Uckelmann | B29C 67/0007 |
| 2016/0271869 A1* | 9/2016 | Van De Vrie | B29C 67/0059 |
| 2016/0288417 A1* | 10/2016 | McCann | B29C 67/0074 |
| 2017/0252812 A1* | 9/2017 | Mykulowycz | B22F 3/115 |
| 2017/0334137 A1* | 11/2017 | Nystrom | B29C 64/393 |

FOREIGN PATENT DOCUMENTS

| | | | | |
|---|---|---|---|---|
| CN | 105643936 A | 6/2016 | | |
| EP | 3067185 A1 * | 9/2016 | ......... | B29C 67/0059 |
| EP | 3067185 A1 | 9/2016 | | |
| WO | 2015055550 A1 | 4/2015 | | |
| WO | WO-2015055550 A1 * | 4/2015 | ......... | B29C 67/0059 |

OTHER PUBLICATIONS

Office Action dated Oct. 29, 2018 of the corresponding China patent application.

\* cited by examiner

3D PRINTING METHOD IMPLEMENTED BY MOVABLE PLATFORM

BACKGROUND OF THE INVENTION

1. Technical Field

The technical field relates to a 3D printing method, and specifically to a 3D printing method implemented by a movable platform. 2. Description of Prior Art 3D-JET printer can read user-input 3D file for a physical 3D model and to jet ink through nozzle, so as to stack the jetted ink upon a platform for forming the physical 3D model corresponding to the 3D file, which is very convenient.

FIG. 1 is a schematic diagram of a 3D printing of related art. In particularly, a 3D-JET printer 1 (refers to as the printer 1 hereinafter) comprises a nozzle 11 and a printing platform 12. As shown in FIG. 1, when performing printing actions, the printer 1 typically controls the nozzle 11 to move along an X axis and a Y axis, and also controls the nozzle 11 to jet ink once the nozzle 11 moves to corresponding positions upon the printing platform 12. Therefore, the jetted inks are stacked upon the printing platform 12, so as to form a desired 3D model.

FIG. 2 is a top view of a swath of related art. In related arts, the printer 1 usually performs the printing actions through SWATH type. Specifically, the nozzle 11 in the embodiment of FIG. 2 is wide in width and embedded with several jetting holes. When being controlled by the printer 1 to move and to jet ink, the nozzle 11 prints upon the printing platform 12 once a swath having a default swath width S, in other words, the nozzle 11 does not print once a point. Therefore, the time consumption of the printing actions is reduced.

As shown in FIG. 2, the printer 1 in related art is to control the nozzle 11 to move along the X axis and to jet ink while it's moving, so as to complete the printing action of a swath (so called one shot). Also, after a swath is printed completely, the printer 1 controls the nozzle 11 to move along the Y axis to re-locate the nozzle 11 to be at a printing position of next swath, so as to print the next swath upon the printing platform 12. Therefore, the printer 1 covers a default platform width W of the printing platform 12 through multiple swaths (i.e., multiple shots).

Because the nozzle 11 needs to jet ink while it's moving, the nozzle 11 needs to be connected with ink cartridges and pumps (now shown) at the rear of the printer 1 through long pipes for ink supplying. Usually, the printer 1 uses the pumps to pressurize the ink cartridges, so the inks in the ink cartridges will be delivered to the nozzle 11 through the pipes, and then the inks of the nozzle 11 can be spurted out. However, the pipes are easily extruded due to the movement of the nozzle 11, and it may cause unstable pressure of the pumps. In this scenario, the size of ink droplets jetted by the nozzle 11 will not be the same. Also, the unstable pressure of the pumps may cause missing nozzle issues. Therefore, the quality of a finished 3D model will be seriously degraded.

Moreover, the movement of the nozzle 11 will cause the inks inside the ink cartridges or the pipes to produce bubbles, which will affect the quality of the 3D model. Furthermore, if the nozzle 11 jets inks while it's moving, the positions of the inks jetted on the printing platform 12 may different from the positions indicated by the 3D file (not shown) because of the inertia of the nozzle 11 due to its movement.

SUMMARY OF THE INVENTION

The disclosure is directed to a 3D printing method implemented by a movable platform, which can prevent traditional 3D printer from having unstably ink supplying and degrading the quality of a finished 3D model when controlling a nozzle to jet inks while it's moving.

In one of the exemplary embodiments, the printing method comprises following steps of: when printing a printing layer, calculating respectively a starting point and an ending point of each swath of the printing layer by a 3D printer; calculating movement information of a movable printing platform upon an X-axis and a Y-axis of the 3D printer according to the starting points and the ending points; controlling the printing platform to move along the X-axis and the Y-axis based on the movement information; and, controlling a nozzle of the 3D printer to jet ink while the printing platform moves to corresponding positions. Therefore, the 3D printer uses the movable printing platform to complete printing actions of each swath.

In comparison with related art, the present disclosure uses a movable printing platform to substitute for the nozzle of traditional 3D printers to move along the X axis and the Y axis, so the length of the pipes behind the nozzle can be reduced. Therefore, the unstably ink supplying issue due to the extruded pipes can be easily solved. As a result, it can then stabilize the quality of ink supplying function, and prevent the missing nozzle issues from occurring.

Besides, the nozzle is restricted to move along the X axis and the Y axis, and the inks are prevented from producing the bubbles due to the movement of the nozzle, so the quality of the finished 3D model is assured. Further, the present disclosure also solve the problem that the traditional nozzle jets inks while it's moving and produces deviations between the positions of the ink jetted on the printing platform and the positions indicated by the 3D file due to the inertia of the moving nozzle.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
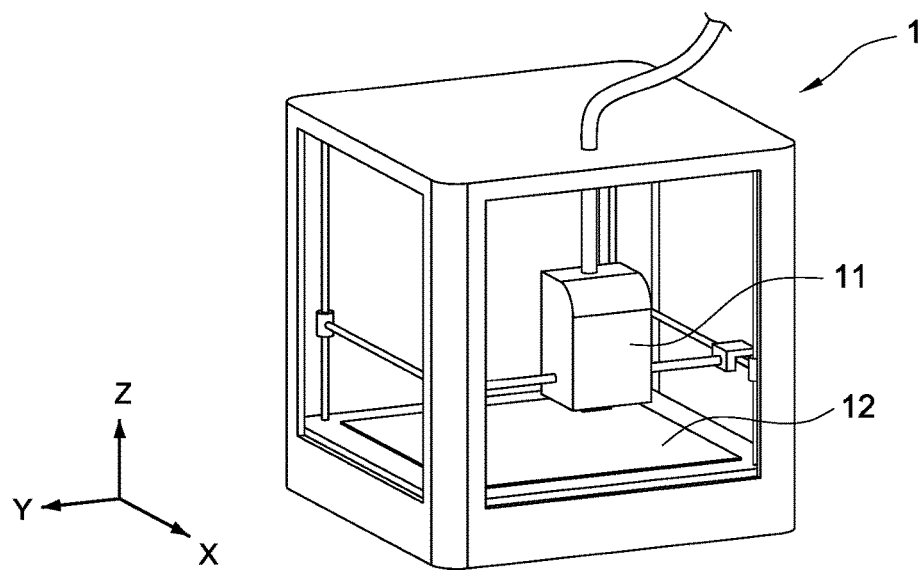
FIG. 1 is a schematic diagram of a 3D printer of related art.
Figure 2:
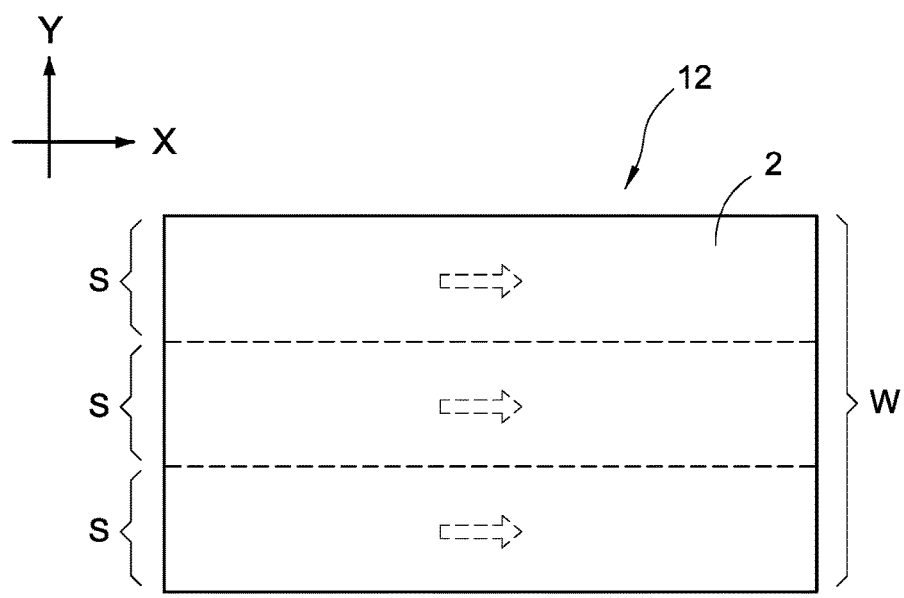
FIG. 2 is a top view of a swath of related art.
Figure 3:
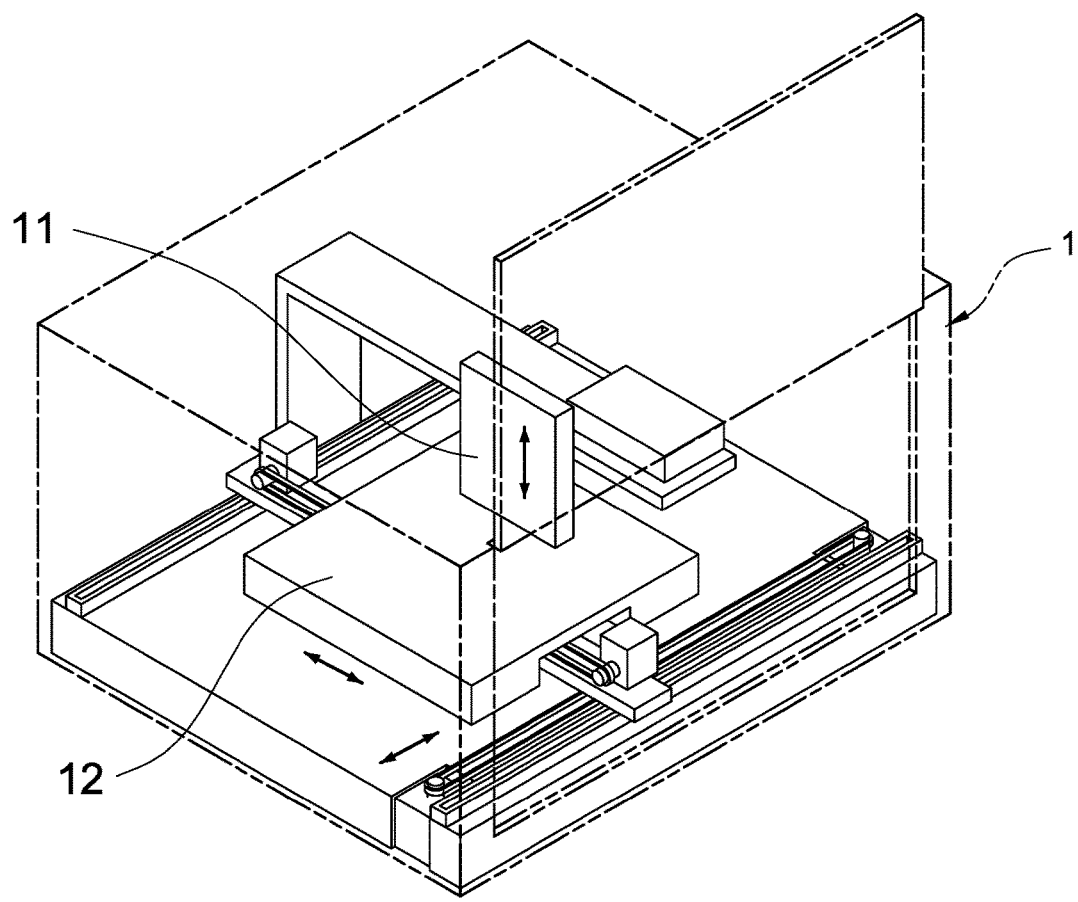
FIG. 3 is a schematic diagram of a 3D printer of a first embodiment according to the present disclosure.
Figure 3:
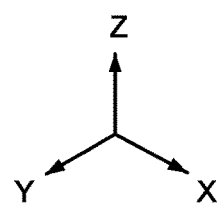

FIG. 3 is a schematic diagram of a 3D printer of a first embodiment according to the present disclosure. This invention discloses a 3D printing method implemented by a movable platform (refers to as the printing method hereinafter), adopted by a 3D printer 3 shown in FIG. 3, wherein the 3D printer 3 comprises a nozzle 31 and a printing platform 32. In particular, in this embodiment, the nozzle 31 is restricted to move along an X axis and a Y axis of the 3D printer 3, and the printing platform 32 is movable, which can be controlled by firmware of the 3D printer 3 to move along the X axis and the Y axis.

The printing platform 32 is arranged to take inks jetted from the nozzle 31, so as to stack the jetted inks to form a physical 3D model upon the printing platform 32. Accordingly, the printing platform 32 needs a big volume. In this embodiment, the 3D printer 3 allows the printing platform 32 to move along the X axis and the Y axis, so the volume of the 3D printer 3 in this invention needs to be bigger than the volume of a traditional 3D printer. For example, if a length of the printing platform 32 is 30 cm and the nozzle 31 is fixed at the center of the 3D printer 3, the 3D printer 3 must have an internal space which has at least 60 cm in length, and the nozzle 31 can completely cover the entire printing platform 32. The printing method implemented through the 3D printer 3 can at least reach the following effects:

(1) Because the nozzle 31 is not necessary to move along the X axis and the Y axis, the length of pipes behind the nozzle 31 can be reduced. Therefore, the problem that traditional 3D printers may extrude the pipes when moving the nozzle and cause unstable ink supplying, results in making different sizes of ink droplets and occurring missing nozzle issues are prevented;

(2) By way of restricting the nozzle 31 to move along the X axis and the Y axis, the problem of bubbles in the ink can be prevented, where traditional 3D printers may cause bubbles to be produced among the inks due to the movement of the nozzle, results in degrading the quality of the finished 3D model;

(3) By way of restricting the nozzle 31 to move along the X axis and the Y axis, the problem of position deviations is also solved, where the deviations to be produced between positions of the inks jetted on the printing platform and positions indicated by an user-input 3D file due to an inertia of the nozzle when it jets the inks while it's moving.

In the present disclosure, the nozzle 31 is wide in width, and the 3D printer 3 uses the wide-width nozzle 31 to perform SWATH-type printing actions, so as to advance the printing speed. In one of the exemplary embodiments, a swath width of a swath is equal or approximately equal to a width of the nozzle 31, and a width of the printing platform 32 is two times as bigger as the width of the nozzle 31, and is smaller than or equal to three times of the width of the nozzle 31. That is to say, the 3D printer 3 needs to print three swaths at least (so called three shots, needs 13 to 16 seconds approximately) to cover the entire printing platform 32.

In other one of the exemplary embodiments, the width of the printing platform 32 can be four times as bigger as the width of the nozzle 31, and smaller than or equal to five times of the width of the nozzle 31. In other words, the 3D printer 3 can print five swaths (i.e., five shots) to cover the entire printing platform 32. However, the above descriptions are just embodiments to this invention, not intended to limit the scope thereto.

Figure 4:
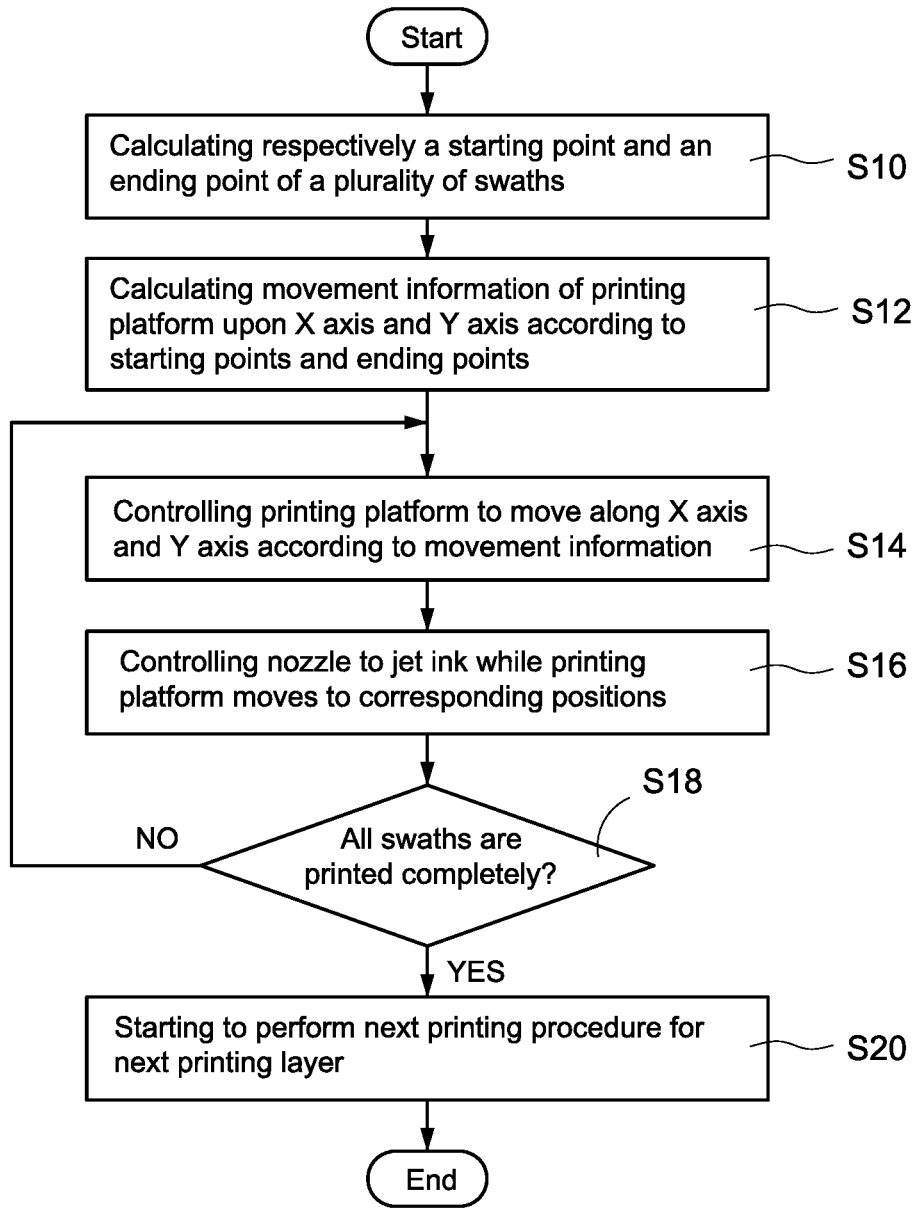
FIG. 4 is a printing flowchart of a first embodiment according to the present disclosure.

FIG. 4 is a printing flowchart of a first embodiment according to the present disclosure. As mentioned above, the 3D printer 3 in the present disclosure performs abovementioned SWATH-type printing actions for printing each printing layer of a 3D model. The embodiment of FIG. 4 discloses a printing action for printing a single printing layer as an example.

Before starting to print a printing layer, the 3D printer 3 calculates respectively a starting point and an ending point of a plurality of swaths of the printing layer through internal firmware (not shown) (step S10). Next, the 3D printer 3 calculates, by the firmware, movement information of the printing platform 32 upon the X axis and the Y axis according to the starting points and the ending points (step S12). In this embodiment, these starting points and these ending points are coordinates of starting pixels and ending pixels of each swath upon the printing platform 32.

It should be mentioned that the present disclosure is to use the movement of the printing platform 32 along the X axis and the Y axis to substitute for the movement of the nozzle in the traditional 3D printer. As a result, the movement information of the printing platform 32 in the present disclosure indicates an opposite direction in comparison with other movement information adopted by the nozzle in the traditional 3D printer. For example, if the direction of the nozzle of the traditional 3D printer to move from a starting point to an ending point of a swath is from the left to the right, then the direction of the printing platform 32 to move in the present disclosure will be from the right to the left.

After the step S12, the 3D printer 3 controls the printing platform 32 to move along the X axis and the Y axis according to the movement information (step S14), and controls the nozzle 31 to jet ink while the printing platform 32 moves to corresponding positions (step S16). While controlling the printing platform 32, the 3D printer 3 keeps determining if all swaths of the current printing layer are printed completely (step S18). After the step S18, the 3D printer 3 re-executes the step S14 and the step S16 if not all the swaths are printed completely, and starts to perform next printing procedure for next printing layer if all the swaths are printed completely (step S20).

Figure 5:
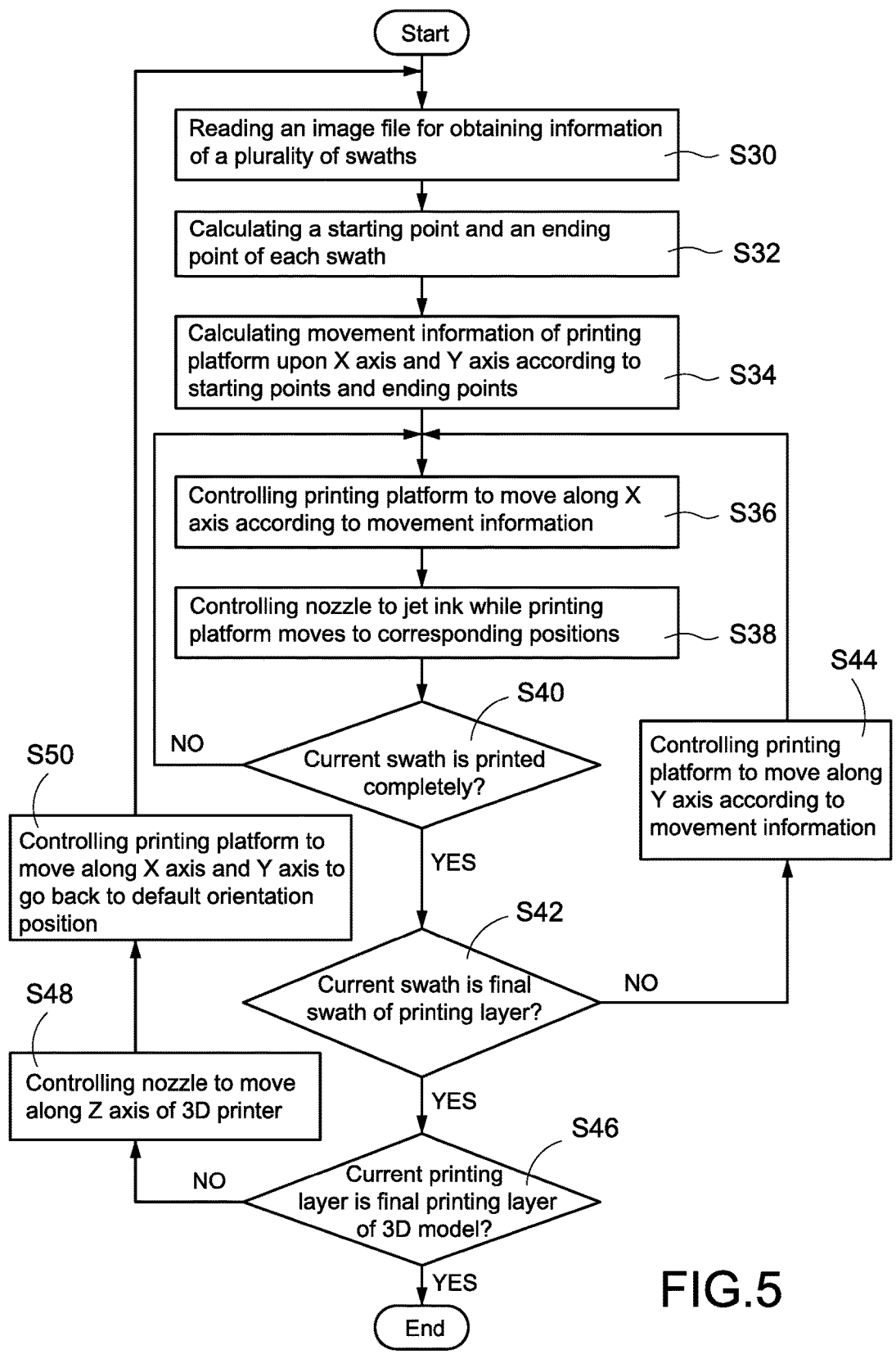
FIG. 5 is a printing flow chart of a second embodiment according to the present disclosure.

FIG. 5 is a printing flowchart of a second embodiment according to the present disclosure. FIG. 5 is used to interpret the printing method of the present disclosure more specifically.

First, the 3D printer 3 reads an image file of a printing layer (which is a first printing layer) when the 3D printer 3 is about to print a 3D model, so as to obtain information of a plurality of swaths of the printing layer (step S30). Next, the 3D printer 3 calculates respectively, by the firmware, a starting point and an ending point of each swath according to the obtained information (step S32), and calculates movement information of the printing platform 32 upon the X axis and the Y axis according to the starting points and the ending points (step S34).

Next, the 3D printer 3 controls the printing platform 32 to move along the X axis according to the movement information (step S36), and controls the nozzle 31 to jet ink according to the information obtained at the step S30 while the printing platform 32 moves to corresponding positions (step S38), so as to print one of the swaths of the printing layer. The 3D printer 3 keeps determining if the current printed swath is completed or not while executing the step S36 and the step S38 (step S40), and keeps executing the step S36 and the step S38 before the current printed swath is completed.

It should be mentioned that in the step S36, the 3D printer 3 is to first locate the printing platform 32, makes the nozzle 31 to be at the position of the starting point of the swath upon the printing platform 32, then controls the printing platform 32 to move along the X axis according to the movement information, and makes the nozzle 31 to be at the position of the ending point of the swath upon the printing platform 32 at the end of this printing action. When the nozzle 31 is at the position of the ending point of the swath, the 3D printer 3 determines that the printing action of the swath is completed.

After the swath is printed completely, the 3D printer 3 determines whether the current printed swath is a final swath of the printing layer (step S42). If the swath is not the final swath, the 3D printer 3 starts to print next swath of the printing layer. On the contrary, if the swath is the final swath, the 3D printer 3 starts to perform next printing procedure for next printing layer.

In particularly, if the 3D printer 3 determines the current printed swath is not the final swath in the step S42, it controls the printing platform 32 to move along the Y axis according to the movement information (step S44), so as to make the nozzle 31 to be at the printing position of next swath of the printing layer, and then re-executes the step S36 to the step S42 for performing the printing action for the next swath. In one of the exemplary embodiments, the step S44 is to locate the printing platform 32, so as to make the nozzle 31 to be at the starting point of the next swath upon the printing platform 32.

If the current printed swath is determined to be the final swath in the step S42, it means the current printed printing layer (for example, the first printing layer) is printed completely, and the 3D printer 3 then determines if the printing layer is a final printing layer of the 3D model (step s46). If the printing layer is the final printing layer, it means the 3D model is printed completely, and the 3D printer 3 terminates the printing method.

If the printing layer is not the final printing layer, the 3D printer 3 controls the nozzle 3 to move along a Z axis of the 3D printer 3 (step S48), so as to make the nozzle 31 to be at a printing height of next printing layer (for example, a second printing layer). In the meantime, the 3D printer 3 controls the printing platform 32 to move along the X axis and the Y axis, so as to move the printing platform back to a default orientation position (step S50). In one of the exemplary embodiments, the default orientation position is the starting point of a first swath of the next printing layer upon the printing platform 32. After the step S48 and the step S50, the 3D printer 3 re-executes the step S30 to the step S46 for performing printing actions for a plurality of swaths of the next printing layer.

The object of the step S48 is to adjust the relative height between the nozzle 31 and the printing platform 32, and the object of the step S50 is to locate the printing platform 32. Before starting to print the next printing layer, the 3D printer 3 must executes the step S48 and the step S50 in advance, but there is no execution order between these two steps.

In the above embodiment, the step S48 is to control the nozzle 31 to move along the Z axis of the 3D printer 3. The size of the nozzle 31 is smaller than the size of the printing platform 32, and the 3D printer 3 in the above embodiment controls the nozzle 31 to move along the Z axis over the printing platform 31, which can effectively reduce the entire volume of the 3D printer 3. However, in other one of the exemplary embodiments, the step S48 can also control the printing platform 32 to move along the Z axis to make the nozzle 31 to be at the printing height of the next printing layer. Therefore, although the volume of the 3D printer 3 is bigger, but the nozzle 31 can be exactly fixed, so the stability of ink supplying function of the 3D printer 3 is greatly improved, and the quality of the finished 3D model is assured.

FIG. 6A, FIG. 6B, FIG. 6C, FIG. 6D, FIG. 6E, FIG. 6F and FIG. 6G are schematic diagrams of a first printing action to a seventh printing action of a first embodiment according to the present disclosure. FIG. 6A to FIG. 6G are used to describe step by step how the 3D printer 3 executes the printing method through moving the printing platform 32 to print multiple swaths of a printing layer (such as printing layer 4 in FIG. 6F). In this embodiment, each of the printing layers 4 is constituted of three swaths, such as a first swath 21, a second swath 22 and a third swath 23, but not limited thereto.

Figure 6A:
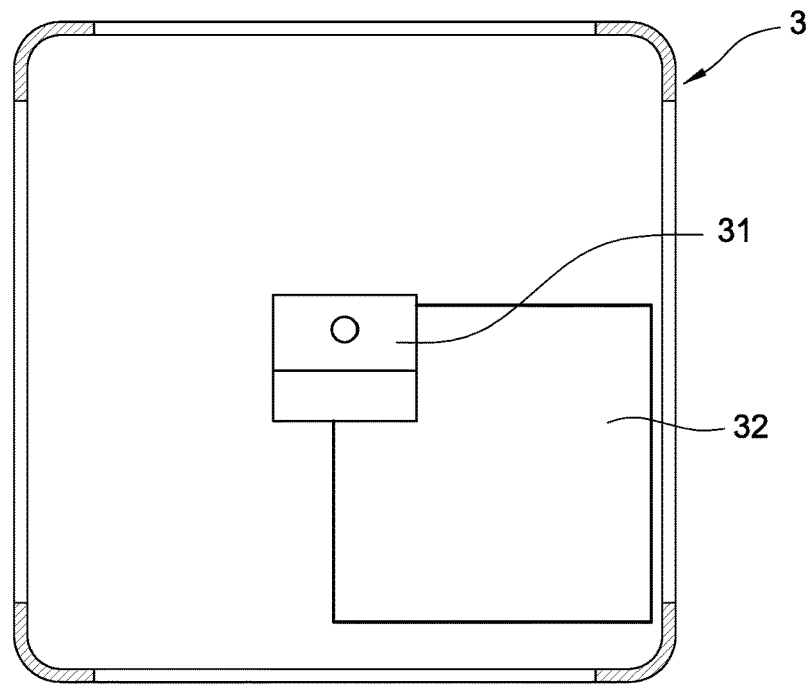
FIG. 6A is a schematic diagram of a first printing action of a first embodiment according to the present disclosure.

As shown in FIG. 6A, when proceeding to print one of the printing layers 4 of the 3D model, the 3D printer 3 first locates the printing platform 32. In particularly, the 3D printer 3 controls the printing platform 32 to move along the X axis and the Y axis, so as to make the nozzle 31 to be at the starting point of the first swath 21 of the printing layer 4 upon the printing platform 32.

Figure 6B:
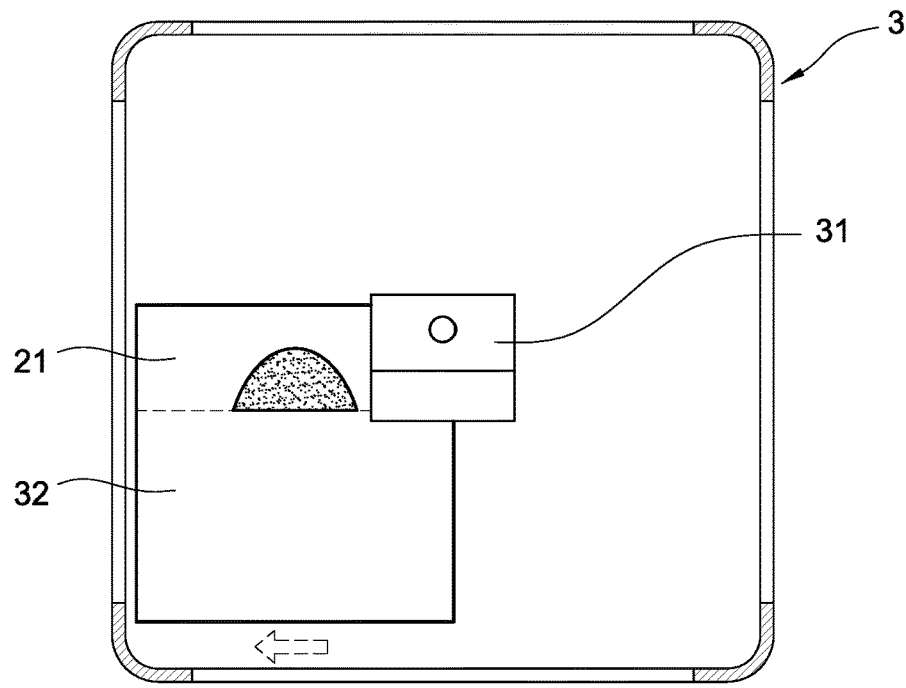
FIG. 6B is a schematic diagram of a second printing action of the first embodiment according to the present disclosure.

As shown in FIG. 6B, the 3D printer 3 then controls the printing platform 32 to move along the X axis according to the calculated movement information, and makes the nozzle 31 to be at the ending point of the first swath 21 upon the printing platform 32 at the end of the printing action. During the movement of the printing platform 32, the 3D printer 3 also controls the nozzle 31 to jet ink while the printing platform 32 moves to corresponding positions. When the nozzle 31 is at the ending point of the first swath 21, the printing action for the first swath 21 is completed.

Figure 6C:
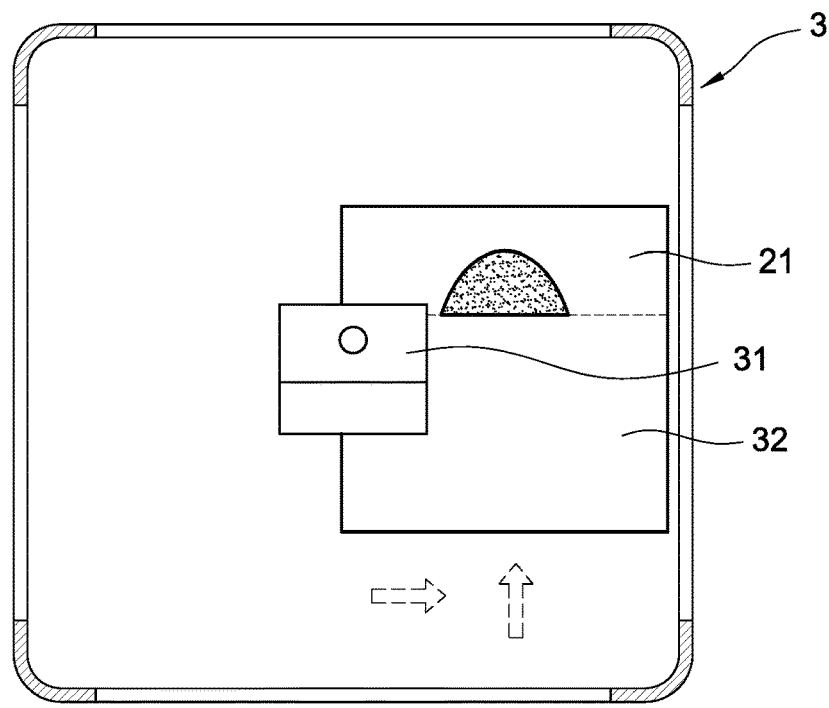
FIG. 6C is a schematic diagram of a third printing action of the first embodiment according to the present disclosure.

As shown in FIG. 6C, after the first swath 21 is printed completely, the 3D printer 3 controls the printing platform 32 to move along the Y axis according to the movement information, so as to make the nozzle 31 to be at the printing position of next swath (i.e., the second swath 22). In particularly, the 3D printer 3 can control the printing platform 32 to move along the X axis and the Y axis at the same time, so as to make the nozzle 31 to be at the starting point of the second swath 22 upon the printing platform 32. In the embodiment shown in FIG. 6C, the starting point of the second swath 22 is the first point from the left of the second swath 22. However, the position of the starting point depends on the physical shape of the 3D model, and the position of the starting point can be any position of the second swath 22, not limited thereto.

Figure 6D:
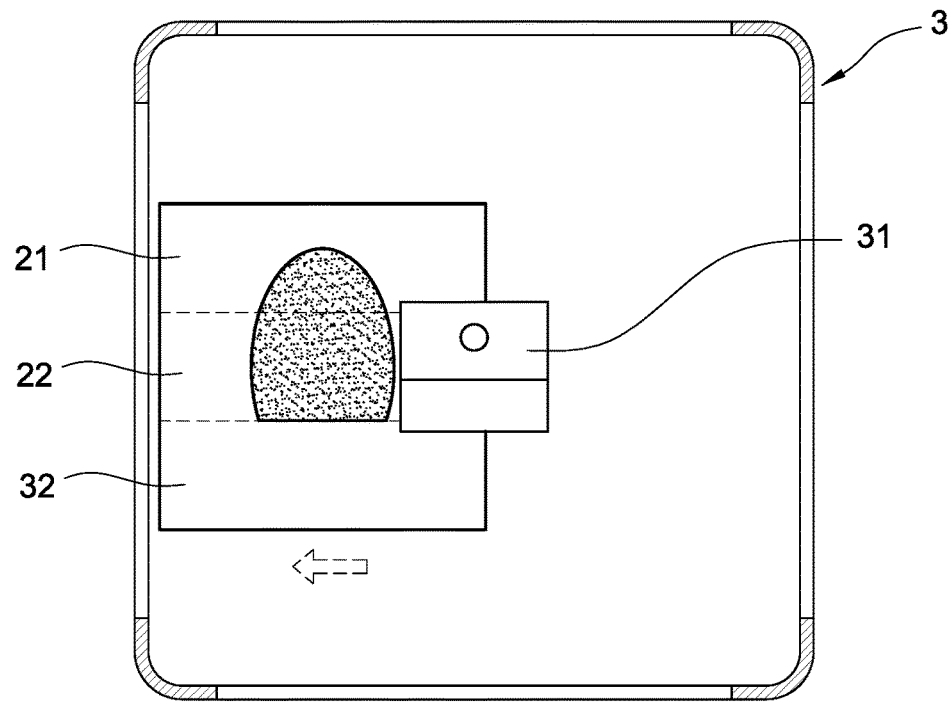
FIG. 6D is a schematic diagram of a fourth action of the first embodiment according to the present disclosure.
Figure 6E:
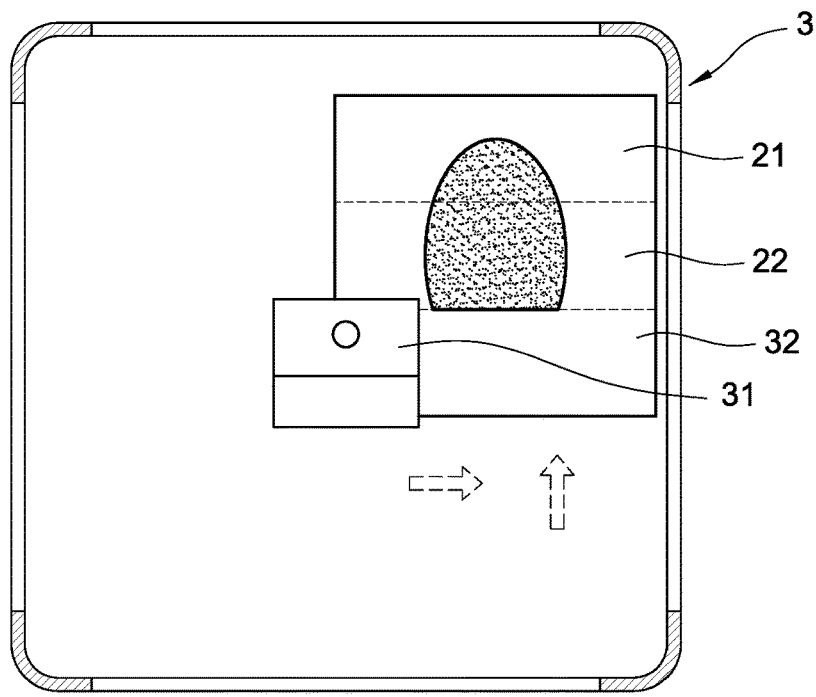
FIG. 6E is a schematic diagram of a fifth printing action of the first embodiment according to the present disclosure.
Figure 6F:
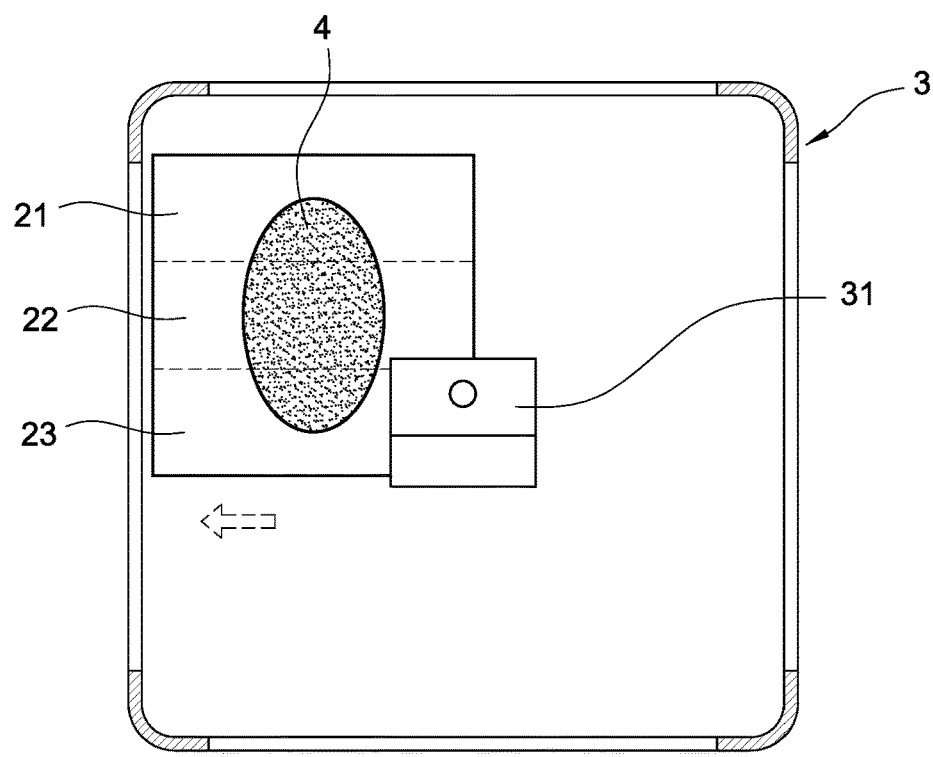
FIG. 6F is a schematic diagram of a sixth printing action of the first embodiment according to the present disclosure.

As shown in FIG. 6D to FIG. 6F, the 3D printer 3 performs the similar method as shown in FIG. 6A to FIG. 6C, which controls the printing platform 32 to move along the X axis and the Y axis, so as to perform remained printing actions for the remained swaths (i.e., the second swath 22 and the third swath 23), and to finish the entire printing procedure of the printing layer 4.

Figure 6G:
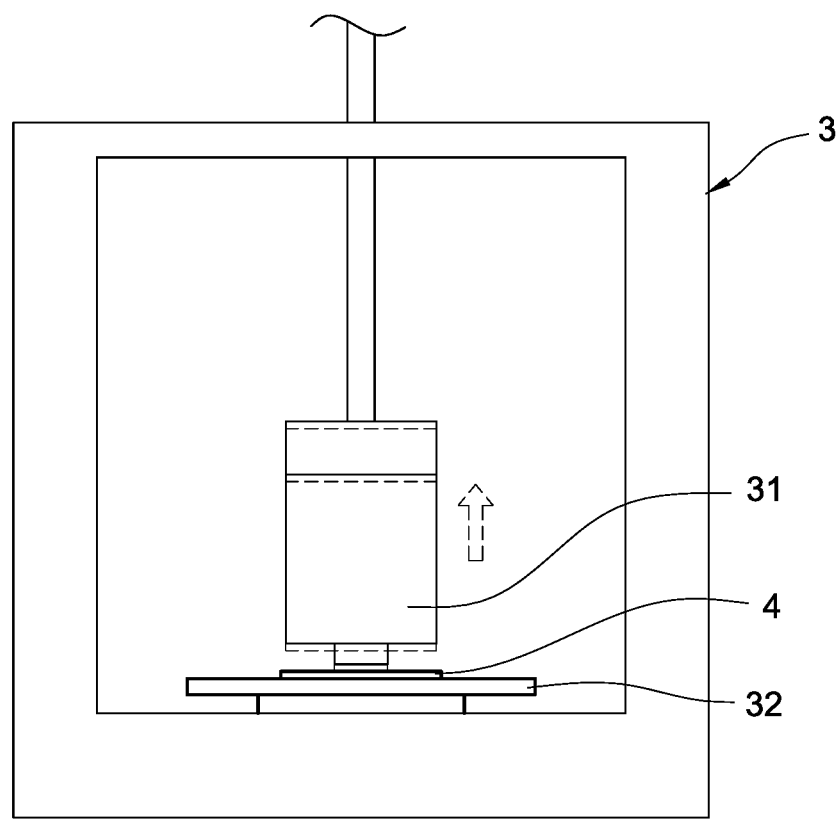
FIG. 6G is a schematic diagram of a seventh printing action of the first embodiment according to the present disclosure.

As shown in FIG. 6G, if all the swaths 21, 22, 23 of the printing layer 4 are printed completely, the 3D printer 3 then controls the nozzle 31 to move along the Z axis for adjusting the relative height between the nozzle 31 and the printing platform 32, so as to make the nozzle 31 to be as the printing height of next printing layer 4.

In other embodiments, the 3D printer 3 can also controls the printing platform 32 to move along the Z axis after the printing procedure of the printing layer 4 is completed, so as to make the nozzle 31 to be at the printing height of the next printing layer 4. In this embodiment, the printing platform 32 can be controlled to move toward three different directions, which are the X axis, the Y axis and the Z axis, and the nozzle 31 is exactly fixed on the internal top of the 3D printer 3. Therefore, the stability of ink supplying function of the 3D printer 3 is improved, and the quality of the finished 3D model is assured.

As the skilled person will appreciate, various changes and modifications can be made to the described embodiment. It is intended to include all such variations, modifications and equivalents which fall within the scope of the present invention, as defined in the accompanying claims.

What is claimed is:

1. A 3D printing method implemented by movable platform, adopted by a 3D printer having a nozzle and a printing platform, the method comprising:
    a) calculating respectively a starting point and an ending point of each of a plurality of swaths of a printing layer;
    b) calculating movement information of the printing platform upon an X axis and a Y axis of the 3D printer according to the starting points and the ending points, wherein the nozzle is immovable upon the X axis and the Y axis;
    c1) controlling the printing platform to move along the X axis in company with the Y axis according to the movement information for locating the printing platform and making the nozzle to be at the starting point of one of the plurality of swaths upon the printing platform;
    c2) controlling the printing platform to move only along the X axis and the nozzle to jet ink for printing the swath while the printing platform moves to corresponding positions, and making the nozzle to be at the ending point of the swath upon the printing platform at the end of the printing action of the swath;
    c3) if determining that the swath printed in the step c2 is not a final swath of the printing layer, controlling the printing platform to move along the X axis in company with the Y axis according to the movement information for locating the printing platform and making the nozzle to be at the starting point of next one of the plurality of swaths; and
    d) re-executing the step c2 to the step c3 to print the next one of the swaths of the printing layer before all printing actions for the plurality of swaths of the printing layer are completed.

2. The 3D printing method in claim 1, further comprises following steps of:
    e) determining if the printing layer is a final printing layer of a 3D model after all printing actions of the swaths of the printing layer are completed;
    f) controlling the nozzle to move along a Z axis of the 3D printer to make the nozzle to be at a printing height of a next printing layer when determining that the printing layer is not the final printing layer; and
    g) re-executing the step a to the step f.

3. The 3D printing method in claim 2, further comprises a step f1) controlling the printing platform to move along the X axis and the Y axis to move the printing platform back to a default orientation position when determining that the printing layer is not the final printing layer.

4. The 3D printing method in claim 3, wherein the default orientation position is the starting point of a first swath of the next printing layer.

5. The 3D printing method in claim 1, further comprises following steps of:
    h) determining if the printing layer is a final printing layer of a 3D model after all printing actions of the swaths of the printing layer are completed;
    i) controlling the printing platform to move along a Z axis of the 3D printer to make the nozzle to be at a printing height of a next printing layer when determining the printing layer is not the final printing layer; and
    j) re-executing the step a to the step d, and the step h to the step i.

6. The 3D printing method in claim 1 further comprises a step a0) before the step a: reading an image file of the printing layer for obtaining information of the plurality of swaths of the printing layer.

7. The 3D printing method in claim 6, wherein an amount of the plurality of swaths is less than five.

8. The 3D printing method in claim 6, wherein the nozzle is wide in width, a swath width of each of the swaths is equal to a width of the nozzle, a width of the printing platform is two times as bigger as the width of the nozzle, and the width of the printing platform is smaller than three times of the width of the nozzle.

* * * * *